W. J. BIGGS.
LOCK FOR VALVES.
APPLICATION FILED FEB. 8, 1919.
1,316,412. Patented Sept. 16, 1919.
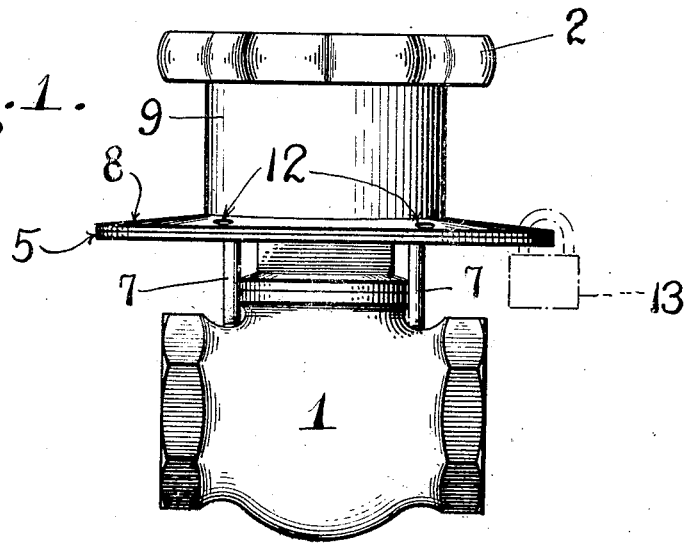
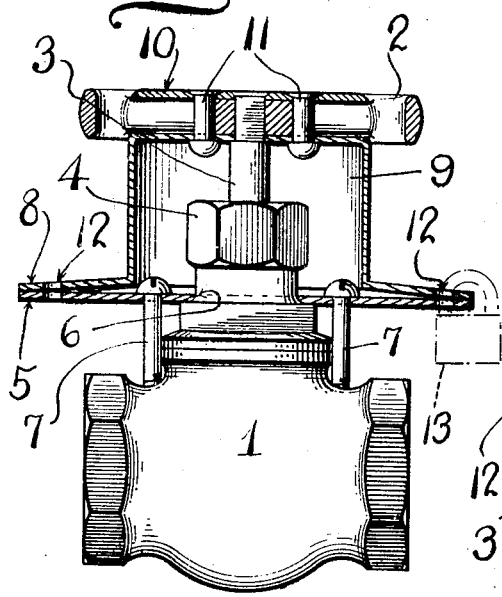
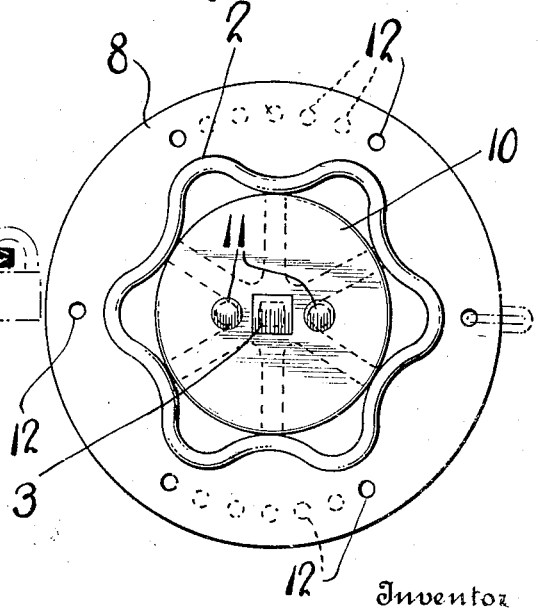
Witnesses
L. B. James
Inventor
W. J. Biggs
By Victor J. Evans
Attorney

UNITED STATES PATENT OFFICE.

WILLIAM J. BIGGS, OF PHOENIX, ARIZONA.

LOCK FOR VALVES.

1,316,412.      Specification of Letters Patent.      Patented Sept. 16, 1919.

Application filed February 8, 1919. Serial No. 275,802.

*To all whom it may concern:*

Be it known that I, WILLIAM J. BIGGS, a citizen of the United States, residing at Phoenix, in the county of Maricopa and State of Arizona, have invented new and useful Improvements in Locks for Valves, of which the following is a specification.

This invention relates to locking means for valves and the principal object of the invention is to provide means for locking the valve in its closed position so as to prevent unauthorized persons from opening the same.

Another object of this invention is to provide a guard for the valve stem to prevent the same from being bent or broken.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is an elevation showing my invention in use on a valve.

Fig. 2 is a sectional view.

Fig. 3 is an end view.

In these views, 1 indicates the valve casing, 2 the stem and 3 the handle. The stem passes through the gland 4, as usual. In carrying out my invention I provide a plate 5, which is provided with an opening 6 through which a part of the gland passes, so that the plate is seated on the said gland. This plate is secured to the valve casing by means of the bolts 7 which have their heads located on the outer face of the plate. Said bolts pass through holes formed in the plate.

The second plate 8 is provided with a cylindrical part 9, this part having its outer end closed as shown. This closed end rests against the under side of the handle 3 and a disk 10 rests on the top side of said handle. The disk is secured to the cylindrical part by the rivets 11 so that the second plate is secured to the handle with the cylindrical part surrounding the stem. This cylindrical part is made of a diameter sufficient to inclose the upper part of the gland when the valve is in closed position and said cylindrical part also covers the heads of the bolts 7 when the parts are in closed position. Each plate is provided with a series of holes 12 which will register with each other when the valve is closed so that a pad-lock 13 may be passed through a hole in each plate so as to lock the parts together. The cylindrical part also protects the stem of the valve from being broken or bent.

What I claim is:—

1. The combination with a valve provided with a spindle and a hand wheel therefor, of a plate secured to a stationary part of the valve, a cylindrical member having one end closed and secured to the wheel with the cylindrical part surrounding the spindle and means for locking the plate and said cylindrical member together.

2. The combination with a valve provided with spindle and a hand wheel therefor, of a plate secured to a stationary part of the valve, a second plate adapted to engage with the first plate and provided with a cylindrical part having a closed end, means for securing the said closed end to the wheel with the cylindrical part surrounding the spindle, said plates having openings therein for receiving a lock.

In testimony whereof I affix my signature.

WILLIAM J. BIGGS.

Copies of this patent may be obtained for five cents each, by addressing the "Commissioner of Patents, Washington, D. C."